(No Model.) 2 Sheets—Sheet 2.
J. VANDEWATER, Dec'd.
E. M. VANDEWATER, Administratrix.
MOWING MACHINE.
No. 336,451. Patented Feb. 16, 1886.
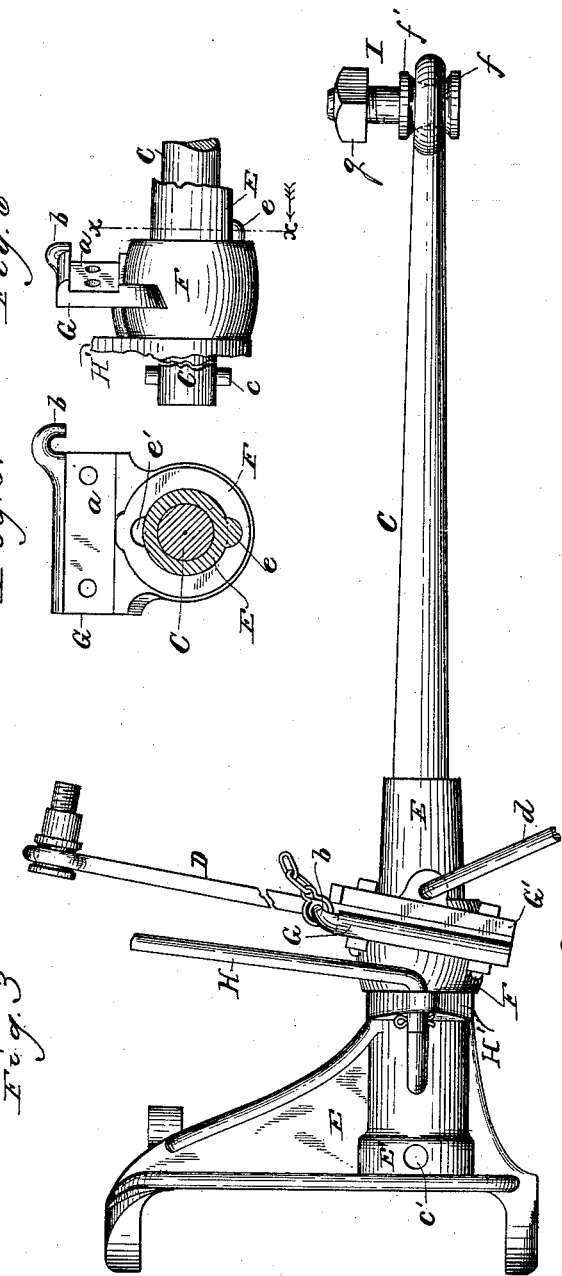
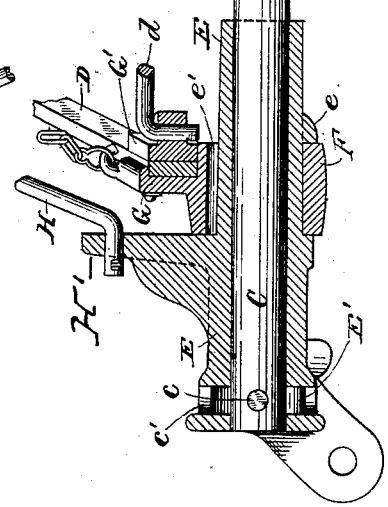
Witnesses.
Henry Frankfurter
Sam'l B. Dover.
Inventor.
Eulalie M. Vandewater.
Admx of Joseph Vandewater
By Philip T. Dodge atty.
N. PETERS, Photo-Lithographer, Washington, D. C.

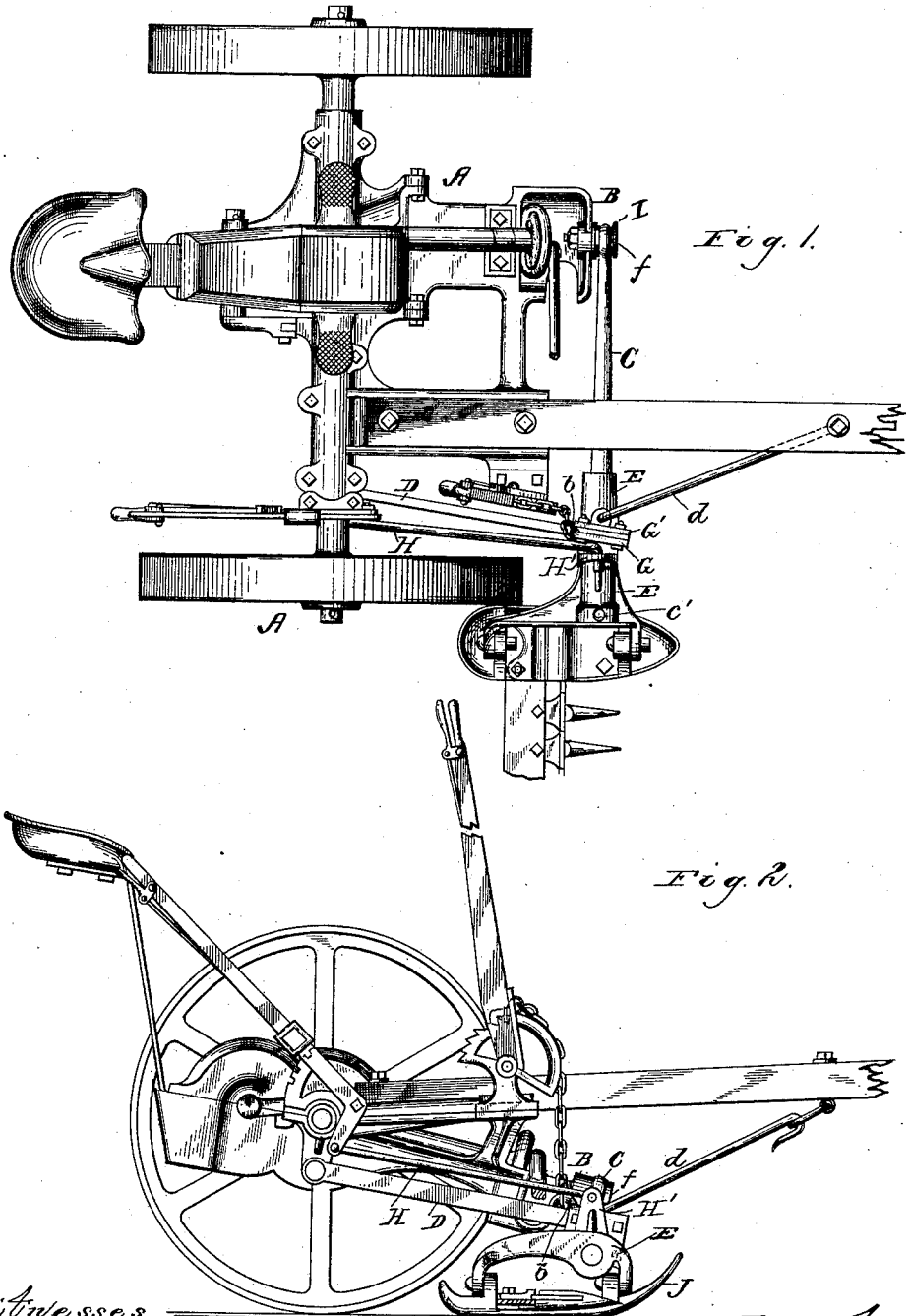

UNITED STATES PATENT OFFICE.

EULALIE M. VANDEWATER, OF WHITEWATER, WISCONSIN, ADMINISTRATRIX OF JOSEPH VANDEWATER, (DECEASED,) ASSIGNOR TO THE ESTERLY HARVESTING MACHINE COMPANY, OF SAME PLACE.

MOWING-MACHINE.

SPECIFICATION forming part of Letters Patent No 336,451, dated February 16, 1886.

Application filed March 25, 1885. Serial No. 160,136. (No model.)

*To all whom it may concern:*

Be it known that I, EULALIE M. VANDEWATER, of Whitewater, county of Walworth, State of Wisconsin, (administratrix of the estate of JOSEPH VANDEWATER, deceased,) do say that JOSEPH VANDEWATER in his lifetime did invent certain new and useful Improvements in Mowing - Machines, of which the following is a specification.

This invention relates to improvements in that class of forward-cut mowers in which the finger-bar is rocked in order to tilt the guards while operating on rough or stony ground, where there is great advantage in being able to make the cutting apparatus conform to the undulating surface or rise over obstructing objects common to meadow-fields. At the same time the cutting apparatus must be so securely attached to the main frame of the machine as to enable it to withstand the great strain consequent to its work in the ordinary function of cutting in heavy tangled grass, also in resisting the jar and strain consequent upon colliding with unyielding obstacles which are liable to be met in many meadows.

Heretofore manufacturers have found it objectionable to construct a forward-cut machine that would have the facility of rocking the bar, on account of the expense and difficulty in constructing, without great additional cost, a machine that would have the desirable flexibility of the cutting apparatus and strength and durability required.

The improvement consists in the construction and combination of devices hereinafter shown, and more fully described and claimed.

Figure 1 of the drawings represents a plan view of a machine embodying the invention, and is necessary to illustrate the subject-matter herein claimed. Fig. 2 is a sectional side elevation of same. Fig. 3 represents an enlarged plan view of the coupling-arm and connections for securing the finger-bar to the machine, and parts of the lifting, rocking, and draft attachments. Fig. 4 is a longitudinal section of Fig. 3. Figs. 5, 6, and 7 are detail views of same.

The cutting apparatus is of the usual contruction, and is hinged to the coupling-arm by means of the ordinary lug attachments to the shoe which supports the finger-bar.

The main frame A of the machine and the gearing, also the drive or main wheels, are such as are commonly known to the trade as the "incased geared iron mowers."

The connections of the cutting apparatus to the frame of the machine as shown in the drawings may be described as follows: The front brace or coupling-arm, C, is secured to the main frame A, in front of the pitman-crank, and by means of a retaining-bolt, I, with a concave head, $f$, which retaining-bolt, after passing through the rounded eye $h$ of the arm C, also passes through a washer, $f'$, which being concave on one side fits snugly in the inner side of the eye $h$, while the other side is flat to fit against the frame, and said retaining-bolt I is secured in the crank-wheel shield B, which shield is a part of the main frame A, by means of its nut $g$. This manner of attaching the coupling-arm secures it firmly and permits the desirable flexibility in raising and lowering the finger-bar and its attachments.

Secured to the lower end of the front brace, C, is a casting, E, which is loosely fitted over said arm C and secured thereon by means of a pin, $c$, which is placed therein when the casting is turned up at right angle to the usual horizontal position and inserted through the hole $c'$ in the casting and through the front brace, C, and when the casting E is placed in its normal horizontal position the pin $c$ will be free to travel in the groove E' in the lower end of said casting E, and admit of its desirable rocking on the arm C, while it is secured from lateral movement thereon. The thrust brace-bar D is pivoted at the rear end to a pendent arm below the main axle of the machine by the same form of bolt as used in securing the front brace, C, to the machine, while the front end of said thrust-bar D is secured to a tubular bracket, F, which is placed on the casting E when in an inverted position, by sliding the lug $e$, which is on the lower part of said casting E, through the groove or slot $e'$, which is in the upper part of the tubular bracket F, and when said bracket is turned up to its normal position by the side of arm H, and the lug $e$ will hold it up against said arm H, and as the thrust brace D secured in the groove $a$ of the arm G, it will securely hold the front brace, C, and the cutting apparatus against any strains or backward thrust while at work, and also admit of the rocking and rolling of the finger-bar, as the casting E, to which said cutter-bar is secured is free to revolve on said arm C and in said tubular bracket F, and the cutter-bar is controlled in its rocking movements and retained in any desired position by means of a lever-rod, H, which is secured to a standard, H', on the casting E, and the rear of said rod H is secured to a lever in the usual well-known manner by its pawl and ratchet. The bracket E has a hook, $b$, attached thereto, to which the lifting-lever chain is attached.

G' is a separate casting, secured to the thrust-brace D by the same bolts that secure it to the bracket F, and the draft-rod $d$ is secured in said piece G', and said draft rod is also attached to the pole or the whiffletrees in any desirable manner.

Thus it will be clearly observed that the inventor has constructed in a very simple manner and at a very small cost a perfect mowing-machine, with all the desired facilities of raising and rocking and rolling the finger-bar.

What I claim and desire to secure as the invention of the said JOSEPH VANDEWATER is—

1. In a mowing-machine, the main frame A, having a crank-shield, B, in combination with the front brace, C, the retaining-bolt I, having the concave head $f$, the concave washer $f'$, and nut $g$.

2. The combination of the main frame, the brace C, its pin $c$, the casting E, its groove E', lever-standard H', and lug $e$, and the tubular bracket F, the slot $e'$, with the brace D, and the rod H and its lever, in the form and for the purposes described.

3. In combination with a brace, C, and the finger-bar, the casting E, connecting the brace and the finger-bar, as described, and provided with a stud, $e$, in combination, with the tubular support F, provided with the groove $e'$, to permit the insertion of the casting therethrough in an inverted position and prevent its displacement when in an operative position.

4. The brace-arm C, the rocking casting E, and its lug $e$, secured thereon, combined with the brace-bracket F, its slot $e'$, and brace D, as shown and described.

EULALIE M. VANDEWATER,
*Administratrix of Joseph Vandewater, deceased.*

Witnesses:
J. H. PAGE,
EDWIN T. CASS.